Oct. 6, 1953 — E. T. LAKE — 2,654,358
PROCESS AND APPARATUS FOR PRODUCING SLATE SHINGLES OR THE LIKE
Filed April 28, 1950 — 8 Sheets-Sheet 4

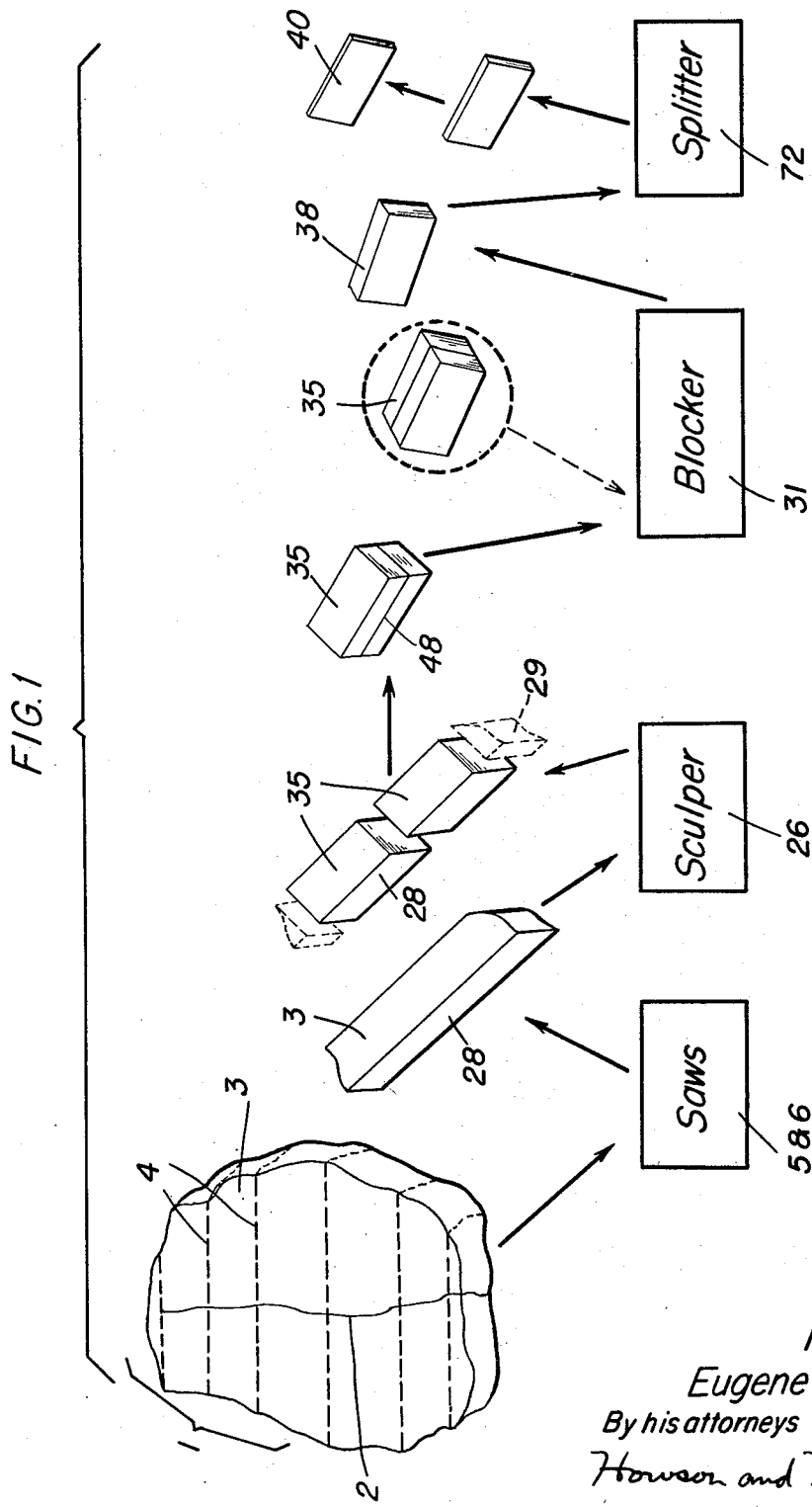

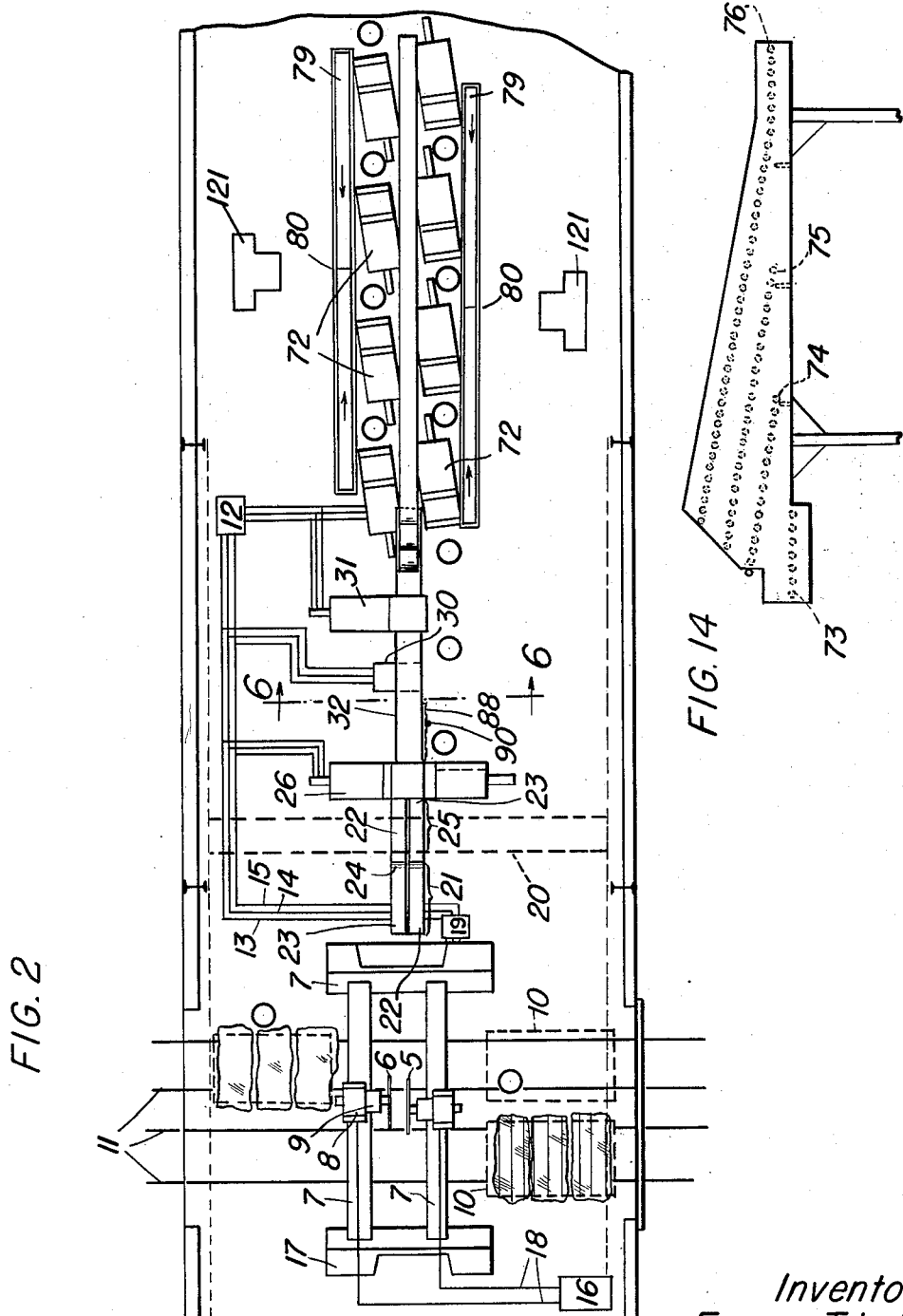

Inventor
Eugene T. Lake
By his attorneys
Howson and Howson

Oct. 6, 1953             E. T. LAKE             2,654,358
PROCESS AND APPARATUS FOR PRODUCING
SLATE SHINGLES OR THE LIKE
Filed April 28, 1950             8 Sheets-Sheet 5
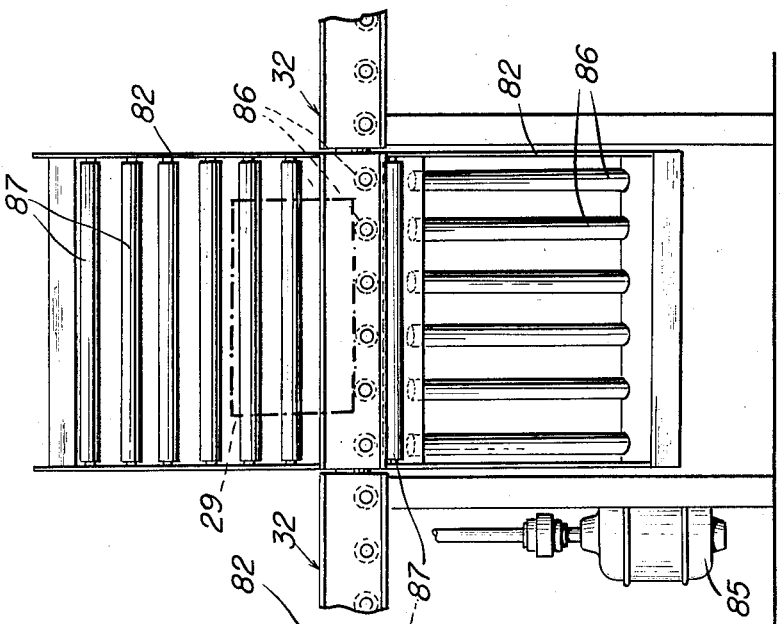
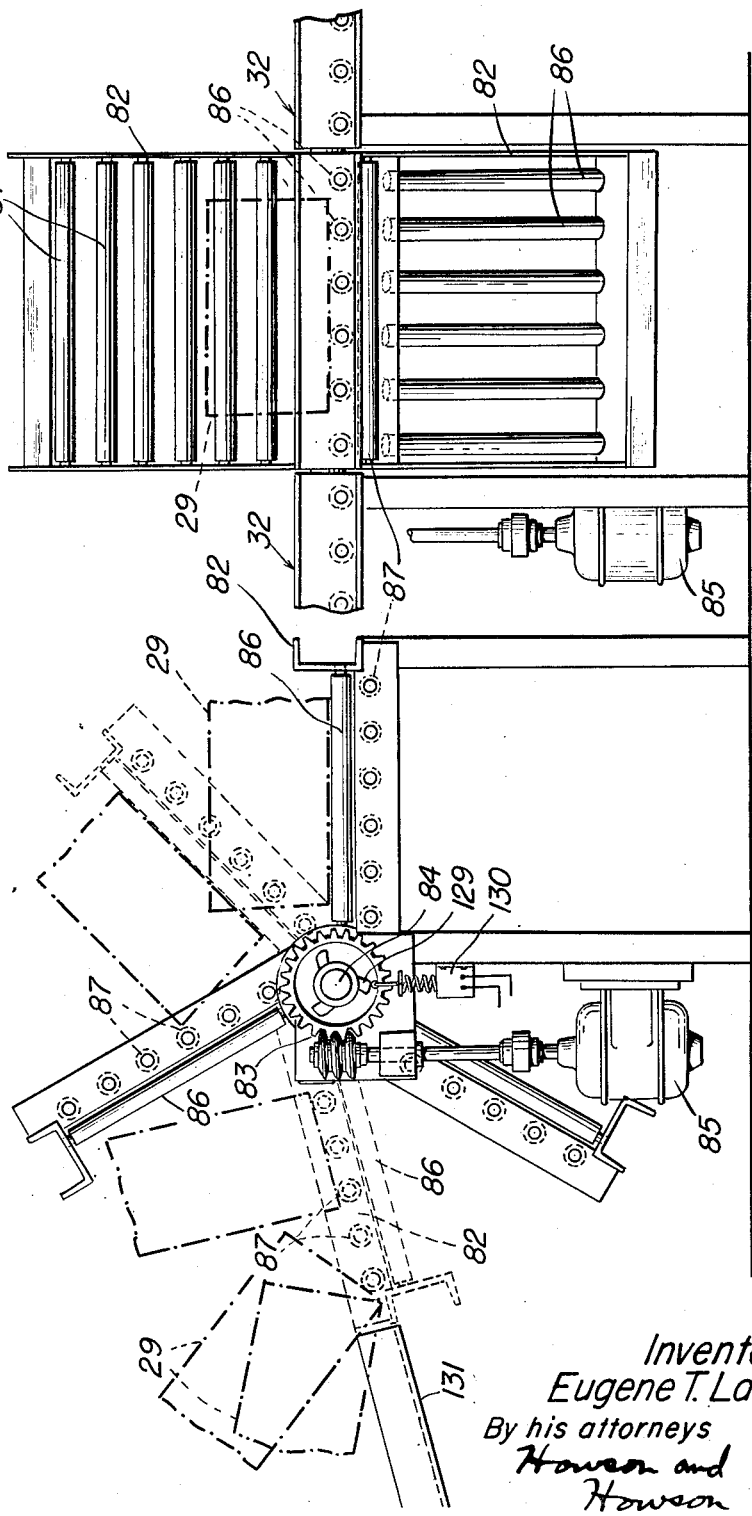
Inventor
Eugene T. Lake
By his attorneys
Howson and
Howson Oct. 6, 1953
E. T. LAKE
2,654,358
PROCESS AND APPARATUS FOR PRODUCING
SLATE SHINGLES OR THE LIKE
Filed April 28, 1950
8 Sheets-Sheet 6
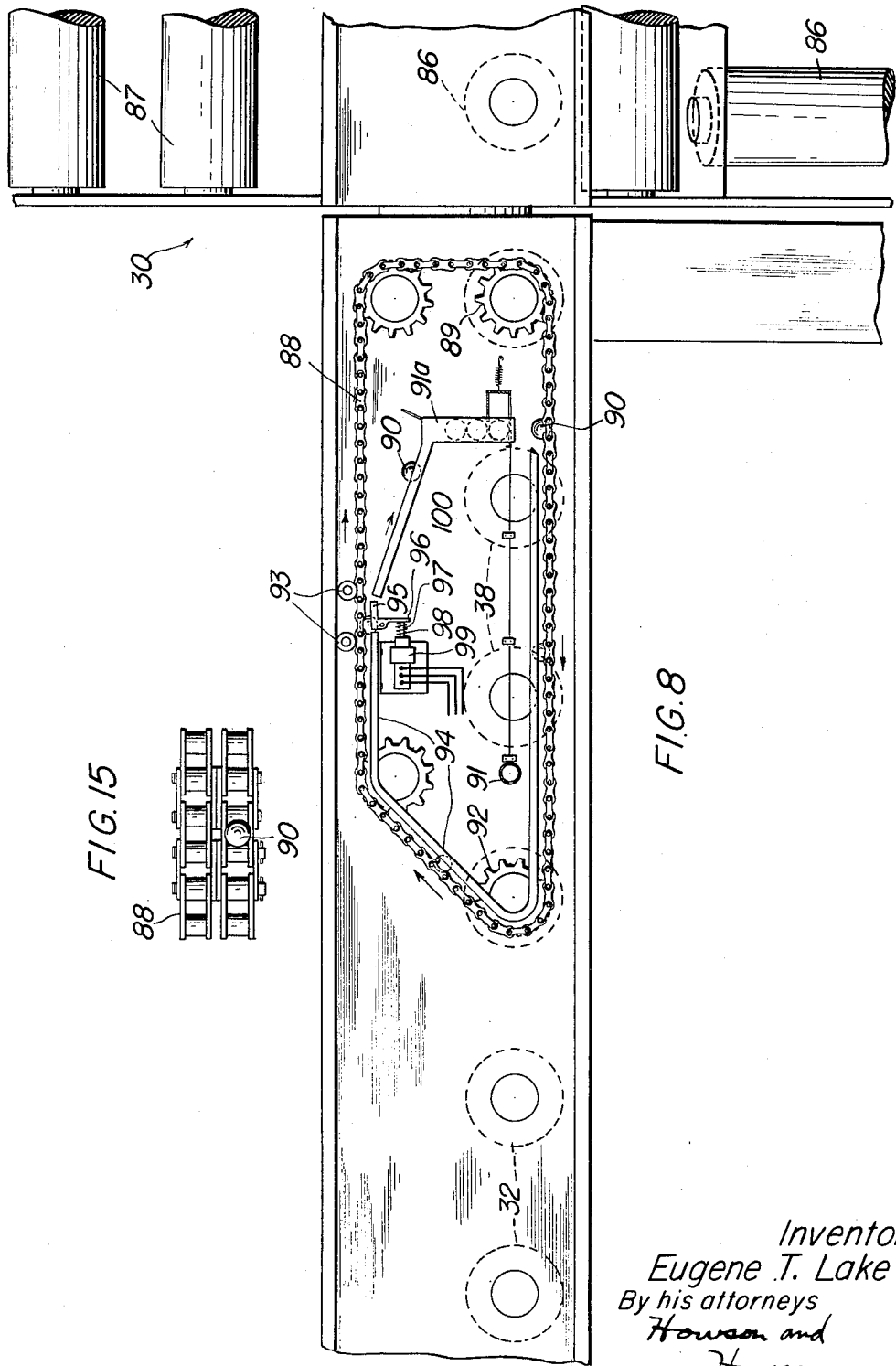
Inventor
Eugene T. Lake
By his attorneys
Howson and
Howson

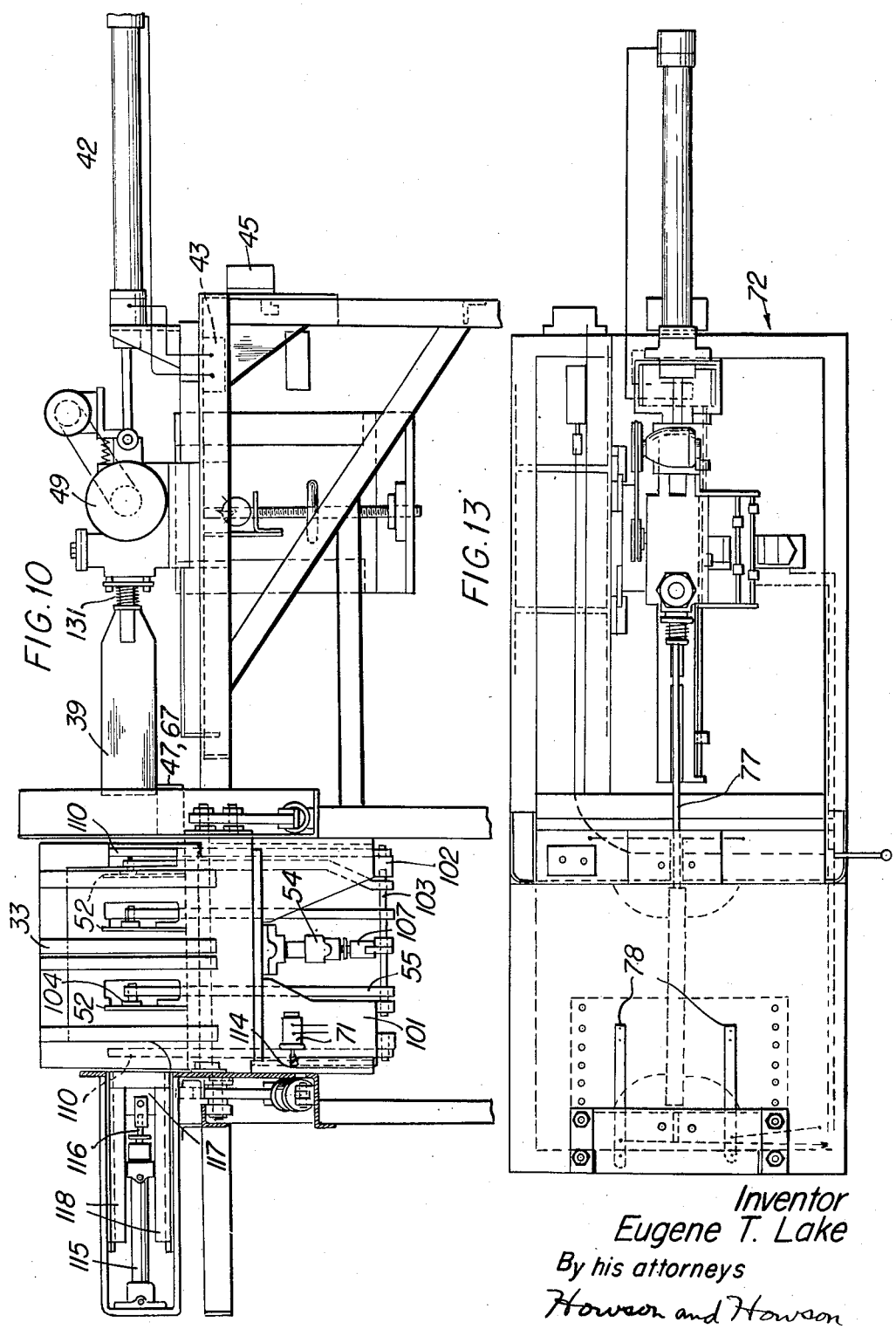

Oct. 6, 1953 E. T. LAKE 2,654,358
PROCESS AND APPARATUS FOR PRODUCING
SLATE SHINGLES OR THE LIKE
Filed April 28, 1950 8 Sheets-Sheet 8
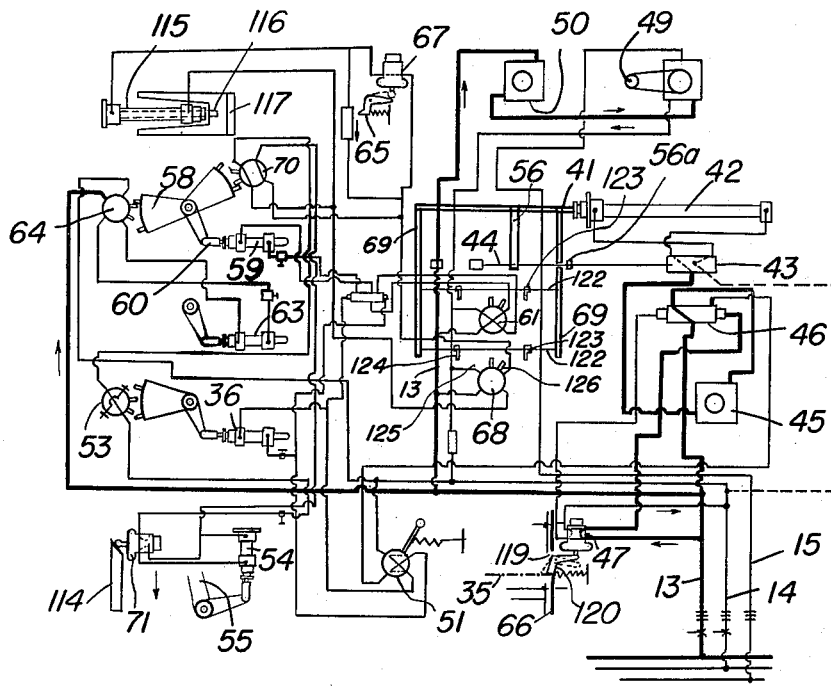
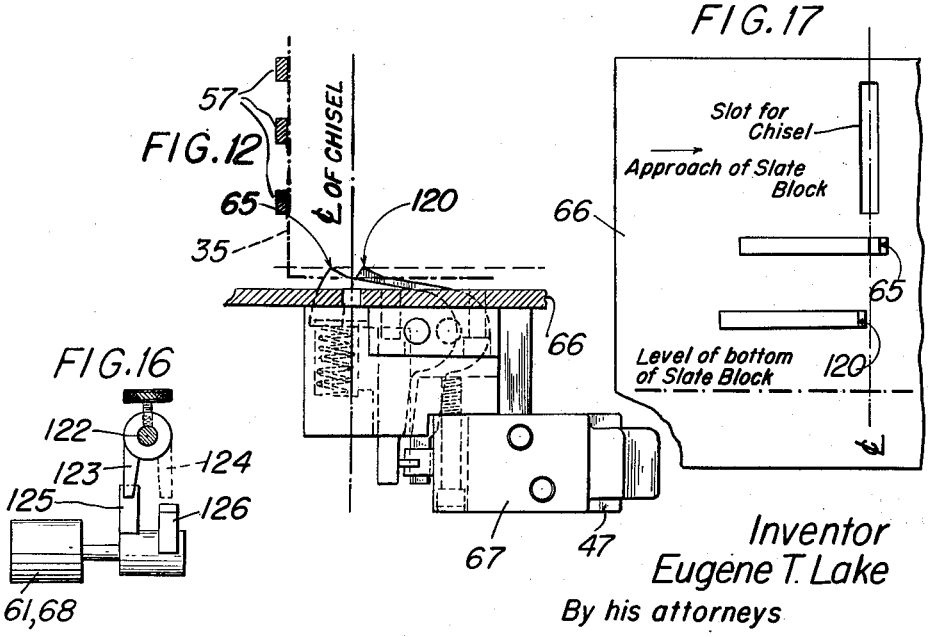
Inventor
Eugene T. Lake
By his attorneys
Howson and Howson Patented Oct. 6, 1953

2,654,358

UNITED STATES PATENT OFFICE 2,654,358

PROCESS AND APPARATUS FOR PRODUCING SLATE SHINGLES OR THE LIKE

Eugene T. Lake, Brodheadsville, Pa.

Application April 28, 1950, Serial No. 158,748

23 Claims. (Cl. 125—23)

My invention relates to a process for producing slate shingles or the like from quarried slabs, and apparatus for carrying out that process. The production of commercial slate from slabs taken out of a quarry has always been a slow process involving mostly skilled hand work and a tremendous waste of raw material. The object of my invention is to speed up the process of producing commercial slate from quarried slabs and to reduce the waste. It is characteristic of my invention that one of the first stages of the process is to saw the block in a plane substantially at right angles to the primary planes of cleavage and the grain, so as to give substantially one of the dimensions of the desired shingle, and thereafter to carry out the remaining steps successively on a series of splitting machines.

In the drawings,

Fig. 1 is a flow sheet diagram of a process of producing slate shingles from quarried slabs according to my invention, in which the raw material is shown in perspective on the face in which it enters and leaves each machine, the showing in the dotted circle indicating that the squared block is turned up on edge as it enters the blocker;

Fig. 2 is a simplified diagrammatic plan view of the arrangement of the apparatus in a saw mill according to my invention, the approximate location of the operators being indicated by circles;

Fig. 6 is a view in elevation across the conveyor between the sculper and the second mechanical splitting machine which is known as the "blocker," the view showing the dumper at the left and being taken on line 6—6 of Fig. 2;

Fig. 7 is a side elevation of the dumper of Fig. 6;

Fig. 8 is a view in side elevation of the indicator which operates the dumper, the view showing the upper part of the indicator chain belt moving in the direction of the conveyor;

Fig. 10 is a view in front elevation of the blocker, partly broken away to show the abutment and upending mechanism. The hydraulic connections are largely omitted;

Fig. 11 is a diagram of the hydraulic elements and connections of the blocker, the pressure lines being shown with heavy lines;

Fig. 12 is a plan view of the abutment stop and is a horizontal view partly in section through the abutment plate of the blocker showing the abutment stop and the lever of the block pilot valve;

Fig. 13 is a plan view of the third type of mechanical splitting machine which is known as the "splitter;"

Fig. 14 is a side elevation of the sorting conveyors between the blocker and the splitters; and Fig. 15 is a plan view of part of the chain belt of the dumper;

Fig. 16 is a view of a detail from Fig. 11 taken on the line of the right slider finger of Fig. 11 looking to the left, showing the tappets actuated by the chisel slider and which change the setting of the lifter cylinder valve and the four-way abutment-valve;

Fig. 17 is a view in vertical elevation of the face of the chisel housing plate showing the relative positions of the chisel, the block pilot valve lever and the abutment stop.

Figure 4:
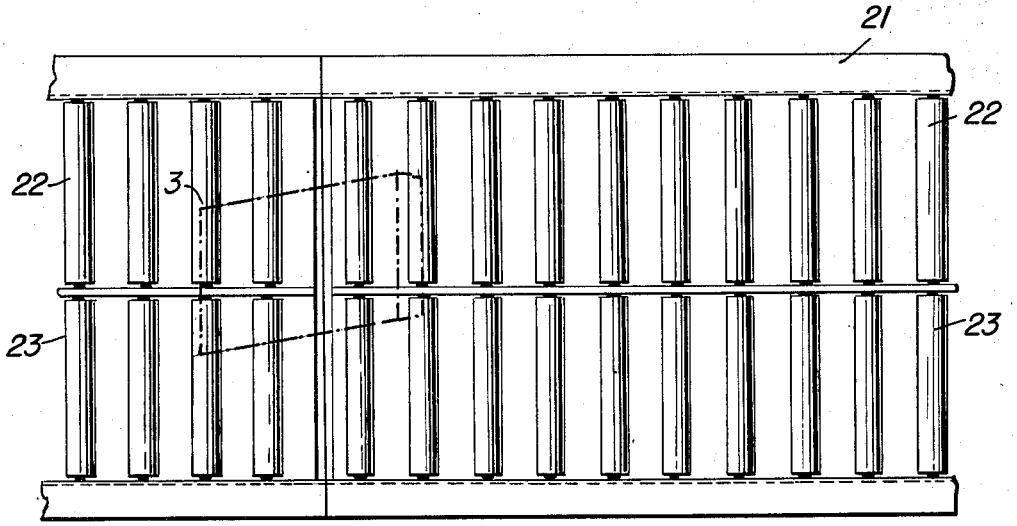
Fig. 4 is a plan view of the parts of Fig. 3.
Figure 3:
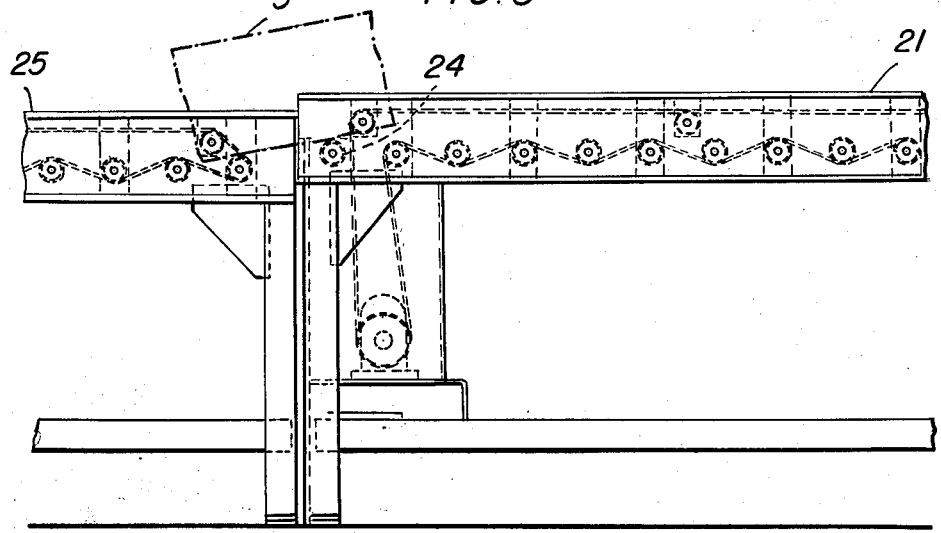
Fig. 3 is a view in side elevation of the juncture of the two conveyors between the saws and the first mechanical splitting machine which is known as the "sculper," this view of my apparatus showing a sawn strip waiting at the juncture until the sculper operator is ready for it.

The production of slate shingles from quarried slabs has been, from time immemorial, essentially a hand process requiring highly-skilled labor. It also has been very slow because of the weight and size of the raw material. In addition, the process has been carried out in such a manner that considerably more than half of the slate brought out of the quarry was wasted and broken up.

Slate is characterized by its fissility, i. e., the quality that enables it to be split in planes of cleavage which produce substantially smooth faces. In addition to the primary planes of cleavage used to produce these faces, slate also has secondary planes of cleavage known as the "grain."

The grain is found in planes that are substantially perpendicular to the primary planes of cleavage. The splits made on these planes by the present methods are somewhat irregular. A quarried block of slate is a large slab that may weigh up to several tons and has two comparatively smooth faces on the primary lines of cleavage. The outline of the slab is generally four-sided but quite irregular because of the exigencies of quarrying it. A typical slab 1 as received from the quarry is shown in Fig. 1. Heretofore such a slab has generally been reduced to size where it can be handled by first splitting it along the grain 2 by means of a hand splitting process. Occassionally this has been by a single-bladed saw. The resulting block thereafter was handled by sawing and hand splitting or by hand splitting alone. It will be noted that the block has not been reduced to either dimension of the desired final commercial shingle by this splitting along the grain. Sometimes, instead of splitting with the grain, the slab is broken across the grain. This is a difficult operation and produces only a rough break. Where I speak of slate or the like, it will be understood that I refer to all stone which has primary or secondary planes of cleavage similar to slate. Such stone is either slate or other non-lamellar fissile rock. Granite is another such stone. Where I speak of shingles, I refer not only to roofing shingles but also to all other commercial sheets of slate.

It has been known heretofore to use machines to split slate, and I call attention to U. S. Patent to Vincent F. Lake No. 1,590,385, dated June 29, 1926. In this machine a vertical chisel blade of considerable width is reciprocated very rapidly against the slate on the natural or primary lines of cleavage. Experiments have shown that this produces almost instantaneous splitting. When the rapidity of this operation is compared with sawing, it will be seen that these splitting machines perform their work very much faster. I have found, however, that considering the entire slate splitting process, the greatest consumption of time is in handling the bulky and heavy raw material. I have devised a process in which the sawing operation is performed only across the grain where there usually are no planes of cleavage, and as a single operation, and I have provided means by which the raw material is handled entirely by machinery until it is reduced to a size that can be easily manipulated by hand. I do this in such a way that loss of material from every cause is minimized. It should also be noted that according to my process no split is longer than the length of a shingle, and that in the sculping stage the split by each chisel is only half the single length. This also minimizes the chances of a split running off. It is an economical process and one by which, in contrast to conditions heretofore, the splitting mill can work all the year round. All three types or stages of splitting in my process are done by machine.

Where I use the work "sculping" I mean splitting or fracturing along or on the grain.

With the majority of quarry and splitter operators it is the opinion of those engaged in the art that slate which has been out of the quarry long enough for the "sap" to dry cannot be split. I have found that this is not true when slate is split by splitting machines having reciprocatory chisels such as shown in the Lake Patent 1,590,385 above mentioned, particularly when the blade is reciprocated at high rates and accurately aligned with the cleavage planes and advanced by strong pressure from the cylinder 42 toward the block, as shown in that patent. This combined action occurs in all three of my types of splitting machines. This inability to split dry slate is also not true when the material is manipulated as hereinafter set forth. My process makes it possible, therefore, for the quarry to work through the summer and fall of the year getting out slate slabs and storing them for splitting at any time in the year, or even years later.

*Sawing across the grain*

According to my process, the first stage or step is for the foreman of the shop to examine the slab and determine what lengths of shingles, i. e., widths of strip, can be produced most economically from that particular slab in the light of any flaws such as "ribbons." These cuts are not in the primary planes of cleavage or in the direction of the grain, but are substantially at right angles to those two planes, namely, in a direction substantially mutually perpendicular to those two planes. Since such strips 3 are produced by cutting on lines 4 in planes that correspond to neither the primary nor the secondary planes of cleavage, I use circular saws 5, 6 to make saw cuts or lines. Such cutting by saws is more accurate than hand splitting and is to one of the final dimensions. Therefore it is less wasteful of material than were previous processes.

The embodiment of the sawing apparatus which I have shown in the drawings consists essentially of an overhead girder 7 on which a carriage 8 moves by which the saw 5 is carried. The circular saw blade revolves at a peripheral speed of about 5,000 ft. per minute. A motor 9 on top of the carriage drives the saw by means of a chain. The slate is placed on one or more cars 10 on railroad tracks 11, the cars being capable of being moved into position under the girder and adjusted with relation to the saw by a ratchet lever (not shown) working on one of the axles of the car. This lever is detachable and can be used on either car. The carriage 8 is fed across the slate by a motor (not shown) on one of the supporting columns 17. The saw may be used to make cuts 4 on the slab or slabs on two cars on two tracks on the same traverse, if desired. It is also possible to use two cars in alternation, loading one while unloading the other. It is also possible to have some cars loading, some having their loads sawn, some being unloaded and others at the dump. After a traverse the saw blade is returned to its initial position and the car or cars adjusted for another cut. After all cuts have been made the car or cars are unloaded and taken away for dumping of the unused pieces.

I prefer to use a hydraulic motor for the feeding of the saw because this prevents the saw from jumping as it cuts through the hard spots in the slab, and further because the control for various speeds is simpler than a mechanical control. These hydraulic controls consist simply of flow-control valves that can be adjusted for all speeds, from stand-still to maximum, and reversing valves. The hydraulic supply comes from a unit 12 which also supplies the three types of splitting machines, the conveyors, the trimmers, etc. in my apparatus (see Fig. 2). For this purpose I have three pipe lines—pressure line 13, return line 14 to tank, and drain line 15.

As indicated above, the shop foreman has marked the block for cutting along such lines 4 as are indicated in Fig. 1 by dash lines on the slab 1. These lines are normally spaced apart distances which can correspond to the lengths of the shingles in the finished products. They may vary in spacing according to natural or quarrying defects in the slab. It will be seen that, as described, the grain 2 of the finished shingle runs from top to bottom, but it should be understood that, if desired, the cuts made by the saw can be adjusted to give the width of the shingle, in which case the grain in the finished article will run crossways of the shingle. The foreman varies the widths of the strips that are to be sawn from the slab in accordance with the most economical use of the material, in avoiding any imperfections in the slab and in accordance with the needs of the mill. The foreman therefore must be skilled in quarrying and splitting slate.

I have found that it is possible and highly desirable to make multiple cuts. Thus, in starting to split the slab shown in Fig. 1, both sides of the strip are sawn simultaneously. For this purpose I mount a second saw 6 in an adjustable manner, parallel to the first saw. By means of having short slides of tracks between the two columns 17 supporting the saws, and by providing hydraulic means, this second saw and its girder can be moved toward and away from the first blade to vary the distance between the blades to correspond to the shortest and longest shingle lengths that it may be desired to make. The two saws, of course, are capable of moving in a direction across the grain of the slabs simultaneously. Each saw is supplied with a line 18 carrying cooling water from a water supply pump 16 and with return drains (not shown). Grit or sand can also be supplied, if desired. Electric and hydraulic controls are all brought down to the floor to a position 19 convenient for the operator.

In connection with the sawing operation, I provide a travelling crane 20, controlled from the floor, that can load and unload the rail cars 10 and carry material to any point in the building. The crane can also be used to arrange or rearrange the splitting machines and conveyors to suit manufacturing requirements.

When the foreman is ready to load the cars, he will select the slabs 1 and have them loaded by a crane or other means onto one or two cars. These slabs are so placed that the grain 2 lies in the direction of the car's length parallel to the railroad tracks and crossing the path of the two saws. The slabs are secured in place on the cars by backing up with pieces of stone or filling in the spaces with wedges or quick-setting plaster. Steel bars can sometimes be used if the top of the car is perforated. The foreman marks with chalk the place where he wants the cuts 4 to be made, and then the car is worked under the saws so that the first cut is located under the saw that is on the far side from the loading side. This is the saw that is fixed lengthwise of the rail tracks 11. The movable saw is then located in the desired position for the second cut. As soon as either saw is in the right position relatively to the slab, that saw may be started. If two cars having the same spacing of cuts have been loaded, the second one may be put into position alongside the first car and the two slabs cut on the one traverse. As soon as the cars are in position, they can be locked to the rails. Upon completion of the first traverse, each saw automatically returns to its initial position, the cars are repositioned and two new cuts are made. The sawing being a slow operation, it will be seen that having two cuts made at the same time and properly spaced, saves time.

When the slab or slabs have been completely cut, the cars can be moved to an unloading point before any parts of the slab are taken off. Then the sawn strips can either be lifted by the crane onto a conveyor 21, or if the strips are not put directly on the conveyor, they can be placed on the storage pile. As soon as the cars have been removed from the sawing position, another car or cars are moved in and sawing of more slabs can be started. As heretofore mentioned, while the sawmill is adapted to handle shingles of different lengths at the same time, and also several widths if desired, the mill may be working on orders for only certain sizes. The strips of those particular sizes may be loaded directly onto the conveyor. The remaining strips will be stored until their particular sizes are in demand. The crane may also bring from the storage space strips heretofore made that are according to the size being worked on at the moment.

*Machine sculping on the grain*

The sawn strips are placed on the conveyor 21 with their primary cleavage planes lying horizontally. They are now ready to be split on the grain into squared blocks whose dimensions correspond to the widths or lengths of the shingles plus allowance for trimming at the end of the process, if such trimming is desired.

I use a mechanical splitting machine which I call the sculper 26 for this operation. The strip is lying on its broadest face as the conveyors 21, 25 bring it up to the sculper.

Figure 5:
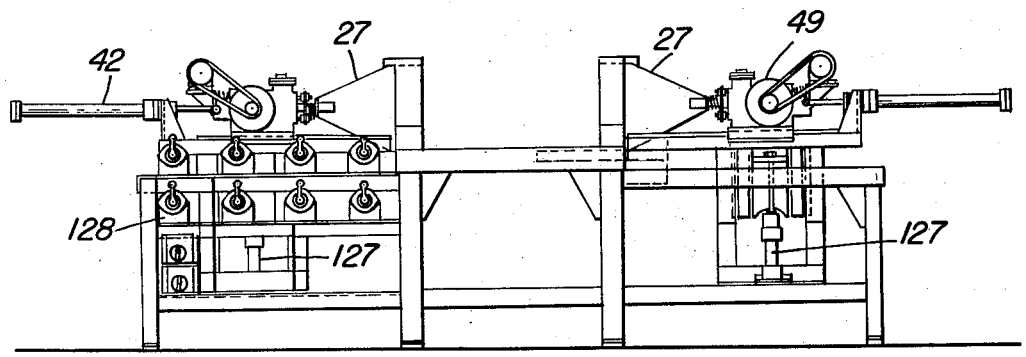
Fig. 5 is a view in front elevation of the sculper of Figs. 1 and 2, showing the two chisel blades.

The conveyor 21 may consist of two rows 22, 23 of rollers, side by side. Each row is separately driven and the relative speeds of the rows can be varied as needed to straighten out a strip. It should be noted that each strip may weigh as much as two or more tons. This conveyor may be operated from the control position 19 at the saws. This enables the saw operator to move a strip away from the saws when he is finished with it. In order that the operator at the sculping machine may be able to manipulate one strip at a time and only when he is ready for it, and thus be able to give a strip short and accurate movements in positioning it for cutting, I use two conveyors between the saws and the sculping machine. The last roller 24 on conveyor 21 may be a free one, not power-driven. It is slightly higher than the rollers of the second power conveyor 25. The sculper operator can operate either conveyor 21 or 25 from his own control station 128 (Fig. 5). The eight controls at this station are assigned as follows—two for the roller rows of the far conveyor 21, two for operating the two chisels, two for changing the elevation of the chisels, and two for the roller rows of the near conveyor. When a sawn strip is pushed onto the free roller 24 until its center of gravity is beyond the roller, it tips up and stops. It is now off the first conveyor 21 and that conveyor 21 can be operated without interfering with the second conveyor 25. The sculper operator can get this strip by starting conveyor 25, or if no strip is there, he can advance conveyor 21 till one arrives.

In somewhat the same manner as in the machine shown in the Lake Patent 1,590,385 above referred to, the sculping machine contains a chisel which reciprocates rapidly, giving a hammering or splitting action. In distinction to mechanical splitting machines such as that shown in the said Lake patent, I prefer to provide my sculper 26 with two power-driven chisels 27 adapted to operate simultaneously on the two opposite sawn sides 28 of the strip 3 at points opposite each other. The chisels are driven by rotating hammers 40 and advanced and withdrawn by hydraulic cylinders 42.

While the grain 2 shown in Fig. 1 is irregular, I find that by splitting from two sides of the strip simultaneously, the split from each chisel has to go only half way, so the splitting is kept straighter than would be the case if it were done from only one side. The operator at the sculping machine should have a knowledge of slate and the market requirements in order to make the most advantageous choices between the market requirements, on the one hand, and defects and discoloration, on the other, as far as concerns the second dimension of the material. In the example being described, this is the width of the shingle. The chisel blades in the sculper stand vertically and move horizontally, as can be seen from Fig. 5. I do not claim in this application the idea of a sculping machine having two blades working opposite each other, except in connection with the other apparatus used in carrying out my process. The first cut which the blades make cuts off the leading ragged end 29 of the strip 3. This ragged end is useless for making shingles and must be disposed of. The cutting is done by causing the two blades to approach the strip until their edges touch the sides. Then the operator causes the blades to press strongly against the strip. This causes the hammering action to commence. As soon as a split is started, the chisels follow it up, hammering when necessary, and only as necessary, to keep the splitting operation going. If a chisel meets a spot that is hard to split, the chisel will wait at that position but will continue hammering. There is no danger of overloading the blade because it is advanced by a limited pressure in a hydraulic cylinder.

If this does not cause the stone to split on a line between the edges of the two chisels, the operator can bring a grooving action into play by causing the blade and hammer to rise and fall while hammering continues. This is done by the cylinder 127 controlled from the station 128. This action imitates that of the workman in blocking out with his mallet and hand chisel. It may be advisable to use a narrower blade 39, such as in the blocker 31 hereinafter described, and cause it to rise and fall a distance to make the blade cover the whole width of the strip. In another alternative, the blade may be made with an interrupted edge or fingers, as described in general in the Vincent F. Lake Patent 1,229,622, dated June 12, 1917. Provision in the design of the machine is made for this. When, in the judgment of the operator, the two grooves are cut deep enough, he causes the blades to press harder against the stone. He thus will bring about a condition analogous to that of the well-known "plug and feathers" operation, except that instead of one point of application of the splitting force he has an infinite number spread along the line of the edge of the chisel or the chisel fingers, and instead of one blow he has thousands. The most advantageous relation of pressure and blow will have to be learned by experience with any given slate. The design of the machine puts these into the control of the operator.

*Dumping machine*

When a ragged end 29 splits off, it drops onto a roller conveyor 32 going to the blocker 31. On the conveyor it comes to a dumper 30 (see Fig. 2). The dumper 30 is shown in detail in Figs. 6, 7, 8 and 15 and is constructed as follows. In the conveyor 32 at a point between the sculper 26 and the blocker 31 is a lifter 81 with three arms 82. This lifter 81 in effect divides the conveyor into two sections. These arms are rotated around a horizontal axis by a worm and a gear 83 and a shaft 84 from a motor 85. These arms pass upwardly between the conveyor sections as they rise. Normally one of these arms stops in a horizontal position in the conveyor 32. There is a plurality of rolls 86 on top of each arm 82 of the lifter similar and parallel to the rolls in the conveyor. Unless a piece of stone is to be dumped, these rolls 86 on the dumper are level with the rolls in the conveyor, and merely permit the stone to pass on to the blocker 31.

When it is desired to discard a ragged end 29 or other piece of stone which is on the rolls 86 of an arm 82 of the lifter, the lifter is turned through say 120°. This tips up the rolls 86 and the ragged end 29 is lifted with them. When lifted to about 45°, the stone will slide toward the hub of the lifter and rest against what was the bottom of the preceding arm 82 of the lifter. This preceding arm, however, has turned say 15° beyond the horizontal so that its bottom is now on top. On the bottom of each arm 82 I provide a series of discharge rolls 87 lying crossways of the arm rather than lengthwise like the top rolls 86. Therefore when the ragged end 29 falls onto these discharge rolls 87, it will slide off the arm easily into a chute or any other desired disposal means as soon as the arm slopes slightly downward into dotted position at the left of Fig. 6.

It is desirable to operate the conveyor 32 and dumper 31 alternately. Thus when a piece of stone to be discarded arrives on the top rolls 86 of the lifter, the conveyor 32 must be stopped and the lifter started. When the lifter has turned 120° and ejected the stone as above described, the lifter must be stopped with arm 82 following the one that lifted the stone in the conveyor with its top rolls 86 in line with the rolls of the conveyor. Simultaneously the conveyor can be started again. Both the dumper motor 85 and the conveyor motor (not shown) are controlled in the first instance from a three-way fluid valve 99 shown in Fig. 8. This valve is controlled mechanically by the operator of the sculper 26 from his position beside the sculper by use of the indicator shown in Fig. 8. The principal elements of the indicator aside from the fluid valve 99 are a moving double chain belt 88 and steel balls 90 adapted to be carried by that chain belt. When it is desired to dump a piece of stone, the sculper operator drops a ball 90 on the belt 88. The entire operation thereafter is automatic, including even stopping the dumper and restarting the conveyor.

As shown in Fig. 15, the chain belt 88 is double and preferably a form of sprocket or bicycle chain. The openings between the solid links provide depressions in which the balls 90 can rest and be held. When a piece of stone, such as a ragged end 29, which is to be dumped, passes a predetermined point on the conveyor 32, the operator drops a ball 90 onto the chain belt 88 by depressing the lever 91 of a ball reservoir 91a. The belt is driven by the axles which drive the conveyor 32. One of these conveyor axles is also connected to a conveyor motor (not shown) which drives the other rolls through a side chain, such as is used on the conveyors 21 and 25 leading to the sculper. On the conveyor axles are sprocket wheels whose teeth engage the links on one side of the double chain constituting the belt 88. The balls 90 are dropped onto the links on the other side of the chain. In Fig. 8 I have shown only two sprockets 89 and 92, the ones between them being omitted for the sake of clarity in the drawing. The sprocket wheels and chain belt are so arranged relatively to the axles of the conveyor rolls that the conveyor rolls advance the stone in one direction while the lower portion of the chain belt between sprockets 89 and 92 moves in the other, as shown by the lowermost arrow in Fig. 8. This indicator chain belt parallels the main conveyor drive (not shown) but is on the opposite side of the conveyor from the main drive. The chain belt is an endless one. It turns upwardly at sprocket 92 and backwardly over additional sprockets at a higher level till over sprocket 89, when it descends to that sprocket. The entire chain belt is confined within the legs of the channel beam constituting one side of the frame of the conveyor. When the chain is at its higher level, I provide small rollers or chain holders 93 to hold it from being forced upwardly any further. To keep a dropped ball 90 in position on the chain, I provide a fixed inner guide 94 that holds a ball in contact with its particular chain link from the time it is dropped onto the chain until the chain is well started on its return at the upper level. Up to this latter point, there has been no play between the chain belt and the guide 94 which would allow the ball to pop out of its nest in its link of the chain. At the point at the upper level where the guide 94 ends it is replaced by an arm 95 pivoted where the guide terminates. The normal spring-pressed angle of the arm is in a slightly upward direction. This spring pressure is obtained from a downwardly-depending lug 96 on the arm resting against a plunger 97 and spring 98 in the hydraulic valve 99. The advance of the ball depresses the arm and opens the hydraulic valve. As the ball is carried beyond the arm by the chain it falls onto a downward slope 100 which leads to the ball reservoir. In the meantime the arm rises again and returns the piston of the hydraulic valve to extended position.

When the piston 97 is pushed into the valve, fluid is cut off from the conveyor motor, thereby stopping it. This pushing in of the plunger also furnishes fluid to the lifter motor 85, causing it to commence turning the lifter and turning the stone on the top rolls 86 over into the chute 131 or other disposal means.

In order to permit the dumping cycle to finish and the ball 90 to roll off the pivoted arm 95, thereby permitting spring 98 to extend the plunger 97 and restart the conveyor, I provide the following by-pass means on suitable places on the three arms of the lifter, or on an extension of the lifter shaft. Lugs or cams 129 are provided so placed that just as one of the arms comes level with the conveyor, the plunger of the three-way valve 130 is depressed. This valve is so connected and timed that when the plunger 97 is depressed by the ball on arm 95, causing the valve 99 to stop sending fluid to the conveyor motor, the valve 130 sends fluid to the lifter motor 85. Therefore until the ball is moved off of arm 95 the conveyor cannot be started through valve 99. This required motion of the conveyor is provided by valve 130 having its plunger depressed by the lugs 129. When this plunger is depressed the motor 85 is partially cut off so as to slow down the shaft 84. This avoids overrunning when it comes to a stop later. In addition, fluid is sent through the valve 130 to the conveyor motor, which causes the chain 88 to move and carry the ball beyond the end of the arm 95. It then rolls to the reservoir 91a. As soon as the ball is off of arm 95, the plunger 97 comes out, driven by the spring 98, and the valve 99 is reset to drive the conveyor and fluid is shut off from the valve 130. The cams 129 are so shaped that at the instant the arm 82 reaches its normal position in line with the conveyor rolls 32, the plunger of valve 130 snaps off of the cam 129, allowing the spring-pressed plunger to extend. This resets the valve for the next movement of the lifter when called for by an indicator ball again rolling on the arm 95. The laps of the plunger over the ports in valve 130 are so arranged that fluid to the motor 85 is not completely cut off until stopped by valve 99, and this is timed by the length of the arm 95 to take place when the rolls 86 are in line with the rolls 32 of the conveyor. Thus, whenever the conveyor is running, the dumper is stationary, and vice versa. The cycle is started by the operator placing a ball 90 in the chain 88 at such a point that the ball passes onto the pivoted arm 95 at the moment that the piece of stone to be dumped reaches the center of the arm 82 of the lifter. As above described, after the lifter is turned 120° indicator means leaves the next arm in normal relation with the conveyor and resets the valves so that the lifter stops and the conveyor is once more running. The distance measured on the chain belt from the point where the ball drops onto the chain to the point where it depresses the lever 95 can be made to correspond to the length of time that it will take the ragged end 29 to reach the top rolls 86.

After the ragged end 29 has been split off, the operator causes the sawn strip 3 to feed through a distance equal to a width of a commercial slate. He can exercise some judgment as to which width to use, dependent upon the positions of defects or ribbons in the stone. He must know thoroughly all the permissible widths for each length of slate so that he can make his decision quickly. These cuts give him a squared block 35. He follows the same procedure for the rest of the strips. The last split leaves a ragged end which may be disposed of as the front end. He then brings in the next strip that has been waiting on the free roller 24 where conveyors 21 and 25 meet.

Blocking machine

The squared blocks 35 are carried forward by the conveyor 32 to the next splitting machine in my system, namely, the blocker 31. This, too, may be generally like the Vincent F. Lake machine of Patent 1,590,385 above mentioned, but I have improved upon that machine. The blocks as they come up to the blocking machine weigh up to 350 lbs., and therefore in many cases are still too heavy to be handled conveniently by man-power. However, the splitting operations remaining to be performed on the blocks will be in the primary planes of cleavage. I have found that it produces considerable breakage to attempt to split large slate blocks when the planes of cleavage are horizontal and the slates are relatively thin. It also is generally inconvenient to arrange the splitting mechanism to operate with the blade horizontal. The tendency to break probably is due to the weight of the block producing uneven strains on the top and bottom parts where the block is being split. It is therefore desirable to upend the block with its primary planes of cleavage vertical. This brings the cleavage planes paralled to the chisel. I have shown in Fig. 9 means to turn the block on edge by machine. This block-turning mechanism is preferable except when making very small shingles.

Block turning mechanism

Figure 9:
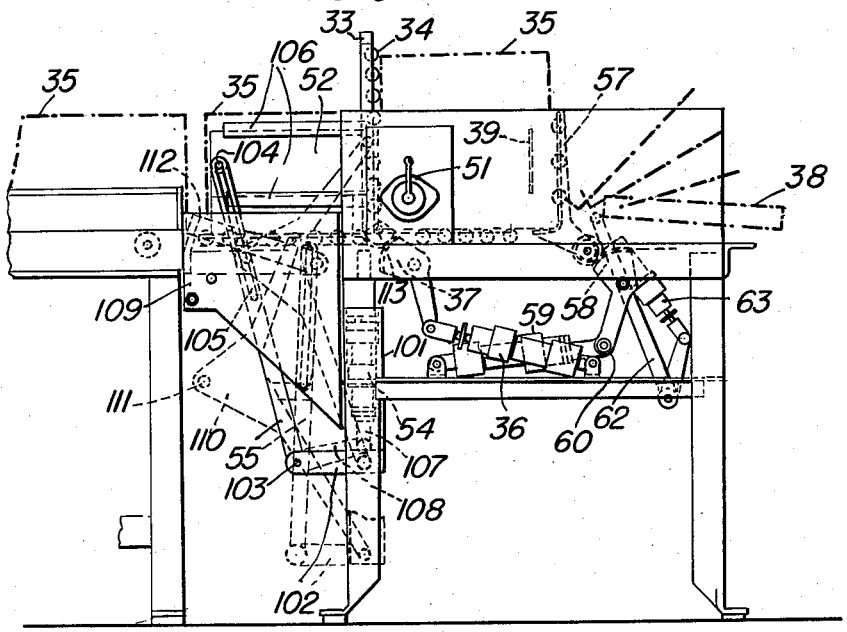
Fig. 9 is a view in end elevation of the blocker of Figs. 1 and 2, the hydraulic connections being largely omitted and also the abutment mechanism appearing at the left of Fig. 10. The view shows blocks at four stages of progress through the machine.

The block-turning mechanism of the blocker has an L-shaped carrier 33 which actually does the turning. The carrier is shown in Fig. 9 in dotted lines in its loading position where the left leg is down toward the sculper and the right leg is in a vertical direction. In its operating position the left leg of the carrier is up in a vertical position, the right leg being horizontal and facing toward the chisel 39 of the blocker. Both legs are equipped with rollers 34 to facilitate moving blocks onto and off the carrier. The 90° turn from loading to operating position serves to turn the block into a position in which the primary cleavage planes are vertical. The upending and lowering movements of the carrier are given iit by a hydraulic upender cylinder 36 through its segmental gears 37 (Fig. 9). This upender hydrauliic cylinder is operated by the control means shown in Fig. 11 with power obtained from a hydraulic power unit 12. As already mentioned, the power unit 12 is connected to all the hydraulic elements of my apparatus by three house lines, the power line 13, the return line 14 and the drain 15 (see Figs. 2 and 11).

While the squared block 35 from the sculper is loaded onto the carrier 33 by shoving it from the conveyor 32 by hand, all the feeding, splitting and ejecting operations in the blocker are automatic. The only control on this machine that the operator needs to manipulate is the manual starter valve 51 shown in Figs. 9 and 11.

When the squared block 35 has been upended till its primary planes of cleavage are vertical, the next operation is to shove the block to the right, as viewed in Fig. 9, until it is in proper relation to the splitting chisel 39. The pushing is done by three pusher plates 52 and pusher levers 55 that rise in back of the block after it has been upended.

In order that these elements may be below the level of the incoming conveyor 32 and the left leg of the carrier 33 while the block is being shoved onto the carrier, the plates and levers are carried on a vertically sliding frame 101 (Fig. 10). Fastened to this frame is a horizontal bracket 102 supporting a common shaft 103 at a distance to the left of the line of the sliding frame and cylinder. This shaft operates the pusher levers 55. These three levers are spaced across the width of the machine opposite the squared block 35, as can be seen in Fig. 10. The upper end of each lever is fulcrumed to one of the vertical pusher plates 52 at a button 104. These buttons slide in slots 105 in the upper ends of the levers 55. These slots permit the levers to push the plates in a horizontal straight line, although they themselves have an arcuate component of movement. The plates work in guides 106 connected at the right end to the carrier 33.

To move these plates horizontally, the piston 107 of the pusher cyliinder 54 is attached to the common shaft 103 in the bracket 102 by a short arm 108 tight on the shaft, provision being made at the end of the arm for straight line motion of the pivot in the end of the piston 107. This cylinder iis mounted vertically, with the piston facing downwardly, and is carried by the sliding frame 101. In Fig. 9 the pusher levers 55 and pusher plates 52 are shown in their upper left position in solid lines where not behind a plate 109 that is part of the frame of the machine.

The vertical movements of the sliding frame 101, and therefore of the pusher cylinder 54, are given by the rocking of the carrier 33 through two links 110, one at each side of the machine. These links are dog-leg in shape, with the lower ends attached to the lower part of the sliding frame 101 in line with the pusher cylinder. The upper ends are pivoted to the left leg or side of the carrier about midway of its length. The two extremes of movement of these links are shown in Fig. 9, the uppermost being their position when the carrier is in operating position and the lower one their position when the carrier is in loading position. At the bend of each dog-leg link is a lug 111 extending crossways to a position under the edge of a barrier 112 pivoted on both sides of the frame of the machine at a level just below the left leg of the carrier 33 when in loading position. The pivot point of the barrier is near the pivot point 113 of the carrier, and the free end of the barrier faces toward the conveyor from the sculper. The dimensions of the parts are such that when the carrier is down in loading position the lugs are some distance below the barrier, so the latter lies below the level of the conveyor 32 from the sculper. When the carrier turns up to operating position the barrier 112 is lifted by the lugs 111 to a position above the surface of the conveyor where it will prevent a block from the sculper entering the blocker. It remains in this position till the carrier comes down again to loading position.

When the carrier turns to operating position it brings the pusher plates 52 and levers 55 to their horizontally retracted, i.e., left, position just in back of the block in the carrier. This positioning is assisted and set accurately by the pressure which is admitted to the under side of the piston in the pusher cylinder 54 (see Fig. 11). In this position the short arm 108 connecting the levers 55 and common shaft 103 to the piston 107 of the pusher cylinder 54 is tipped up and the piston fully retracted. When fluid is introduced into the cylinder above the piston, the short arm is depressed and the pusher levers and plates push the squared block to the right into position for splitting, as will be explained hereinafter.

When it is desired to tilt the carrier back to loading position the pusher plates 52 are lowered, turning about the pivot 113 of the carrier. As the button pivots 104 of the plates pass the horizontal position of the carrier they therefore begin to swing to the right, as viewed in Fig. 9. This carries the pusher levers to the right, also thus tending to pull the piston part way out of the cylinder. It will be noted that this occurs regardless of any operationally required vertical movement of the pusher cylinder 54 and the bracket 102. It is therefore necessary to provide some means for by-passing the fluid in the cylinder, both above and below the piston. I use a four-way valve 71 as a by-pass (see Figs. 10 and 11). This is carried on the side of the sliding frame 101. To operate it I provide a plate cam 114 so located on the fixed frame of the machine that as the sliding frame moves down, the cam depresses the plunger in the valve. This plate cam is adjustable for timing purposes, and it causes hydraulic connection between the two ends of the pusher cylinder 54. Because the rod attached to the piston 107 occupies part of the space below the piston and there is no corresponding reduction in the space above the piston, any movement forced by the piston will cause a flow from one side to the other through the four-way valve 71. This is either in excess of or in deficiency of the space to receive it. I therefore provide a connection

Blocker feeding, splitting and ejecting mechanism

I will now describe the operation of the blocker feeding device above set forth. Let us assume that the carrier 33 is in loading position, and the pusher plates 52, pusher levers 55, links 110, sliding frame 101 and pusher cylinder 54 are in their lowest positions. The operator pushes a squared slate block 35 onto the carrier 33 from its waiting position, as shown in dot-and-dash lines at the left of this figure. When the block is in satisfactory position against the then-vertical right leg of the carrier, the operator throws the manual lever 51 to starting position. He holds the lever in this position until the machine is properly started. He then lets go and the handle automatically goes back to neutral by the action of a spring. The operation of feeding, splitting and ejecting is entirely automatic from now on.

The manual control valve 51 is connected to the upender cylinder 36. Throwing the lever to starting position causes the upender cylinder to begin to swing the carrier 33 from loading to operating position. Acting through the dogleg link 110, this movement of the carrier causes the sliding frame 101 to rise to its upper position. When the frame has risen part way, the plunger of the by-pass valve 71 rides off its plane cam 114 and the main pusher circuit is established through a four-way pusher valve 53 controlled by the upender gears 37 and a pusher valve 70. When the carrier reaches operating position the pusher plates 52 are in position behind the block and the pusher levers are at the left, as shown in solid lines in Fig. 9. The upender gears 37 have now moved valve 53 to operating position so that fluid may flow into the pusher cylinder under the control of the pusher valve 70. The function of the valve 70 is to cause momentary reversal of the pusher plates 52 when slate is being split. Without such relief there is danger of breaking the slate, etc. The pressure port of valve 70 is connected to the hydraulic line connecting the abutment valve 68 and the abutment stop valve 67. By this arrangement the abutment valve 68 controls the beginning of the movements of the abutment cylinder 115 and the pusher cylinder. The end of the movements for both of those cylinders is when they have pushed the slate block into the desired position. For the pusher cylinder this occurs when the slate block has been pushed against the stops on the lifter 57. For the abutment cylinder it occurs when the cylinder has pushed the slate block against lever 65.

Both of these motions must be completed before the chisel commences to act on the slate. To provide time for this and also to provide for the control of valve 68 from the motion of the slide carrying the hammer, the stroke of the slide is so adjusted by the tappets 56a that the chisel withdraws on the return stroke about as far behind the face plate 66 as it advances beyond the face plate on its splitting stroke. Hence the time that the edge of the chisel on its return stroke leaves the slate, until the time that it again meets the slate on the splitting stroke, is a period of time available for placing or locating the block. This part of the cycle of movement of the chisel is known as the "overtravel." This "overtravel" is also useful to permit the removal and replacement of the chisels. For this purpose the reciprocation of the slide can be controlled by hand manipulation of the valve rod 44.

When the lifter 57 commences to swing, which it does as soon as the chisel has entered the slate, it releases the pressure of the stops against the slate. At the same time the pressure of the pusher plates must be released to allow the slate to move sufficiently, about one-half the thickness of the chisel, to reduce the tendency to bend the chisel. This is accomplished through the valve 70. This valve is controlled by the turning of the lifter 57. As the lifter starts to turn, the valve 70 reverses the port connections, which reverses cylinder 54, and hence the pusher plates 52 are withdrawn from the slate block. When the lifter 57 swings upward again, the valve 70 is again reversed, resetting it. Then valve 68, under the influence of one of the tappets 68 on the slide, is reversed so that the fluid drives the pusher plates 52 and the abutment plate 117 back to their initial positions, ready to adjust the slate block for another split. The movements of valve 68 take place only during the "overtravel."

The blocker is made to split off blocks of the desired thickness beyond the single chisel 39 of the blocker. As a result the production of a block which in thickness is equal to that specifically desired, is ensured. This distance should always be an "even factor multiple" of the final shingle thickness, for a reason that will be explained later. By "even factor multiple" I mean that the thickness shall be a multiple of the final shingle thickness all of whose factors other than unity are even. Expressed another way, the multiple shall be an integral power of two where unity is the final shingle thickness. Hereafter, when I refer to a "multiple thickness" block, I mean one whose thickness is an "even factor multiple" of the thickness of the desired shingle.

As soon as a block from the sculping machine has been positioned, the chisel 39 begins to operate and splits off a block of the desired thickness. This "multiple thickness" block 38 is then laid over on its side by a lifter 57 in the machine and pushed by an ejector 62 onto a conveyor leading to the third type of machine, the final splitting machine 72. After each block 38 of the desired thickness is split off from the squared block and disposed of, the remainder of the squared block is pushed into splitting position by the pusher plates 52 and the abutment plate 117 operated by pusher cylinder 54 and abutment cylinder 115. This operation is repeated until the squared block 35 is too thin to make another block 38 of the desired thickness. The chisel hammer action then stops automatically but the lifter end ejector continue and throw out the last piece of slate. After the squared block has thus been used up and the chisel and hammer have stopped their reciprocation, the carrier is rotated back to loading position by changes in the hydraulic connections with the chisel-hammer mechanism. When the carrier returns to loading position the sliding frame, acting through the by-pass valve 71, cuts in the main pusher circuit and the machine stops. The blocking machine is equipped to receive blocks of any length and to adjust itself automatically to split them.

Hydraulic controls on blocker

I will now describe the details of the construction and operation of the hydraulic controls for the splitting and unloading section of the blocker 31. As in the case of the sculper 26 and the splitters 72, the pressure for the chisel is hydraulic. I use a rotating hammer 49 on the slide 41 and between the hydraulic cylinder 42 and the chisel 39. The hammer is driven by a hydraulic motor from the lines of the power unit 12 and controlled by a flow control valve 50. The hammer cylinder 42 is connected to the power supply line 13 through a mechanically operated four-way hydraulic valve 43 controlled by valve rod 44. There is a flow control valve 45 and three-way valve 46 between the supply line and the four-way valve 43 to control hammer and chisel movements.

The slide serves to carry the chisel forward as the split is made and to retract it. The slide moves to the left as viewed in Fig. 11 to carry the chisel into its splitting action against the block. To set the limits of the movement and to reverse it there is a finger 56 carried by the slide and projecting downward to and encircling the valve rod 44. This finger slides on the valve rod. There are two stops 56a on the valve rod, one on either side of the finger 56 and spaced therefrom. When the finger 56 touches one of the stops it moves the valve rod longitudinally which reverses the connections in the valve 43. This changes the fluid connections to the cylinder 42 and the piston in the cylinder and the slide change the direction of their movement. The stops are set so that reversal from the extreme left position occurs when the split has been made in the block and the chisel is to be retracted. The stop in the other direction is located to cause reversal from the extreme position on the right in Fig. 11 when it is time to advance the chisel toward the slate block for a new split. By placing the right-hand stop 56a to the right of the position shown, the "overtravel" is increased. These reversals will continue automatically until there is no block opposite the bell crank lever 120 (see Figs. 12 and 17).

These stops on the valve rod 44 are preferably set to give a length of stroke which is greater than the length of the split in the slate block. The over-travel from such adjustment permits the blade to withdraw behind the line of the abutment face plate 66 by an amount sufficient to permit valve actions that may be desired at such times.

It might be noted that the driving arrangement I have described gives a peculiarly useful combination of actions of the chisel, as follows. When the slide endeavors to push the chisel forward it sets up a pressure on the edge of the slate which causes the chisel to retire into the hammer housing. This starts the vibration effect because the chisel socket is forced back into a solid relation with the hammer 49. When the pressure on the edge of the chisel becomes less than the strength of the spring 131 around the socket (Fig. 10), the socket is forced outward, pulling it away from contact with the hammer. Thus the hammering automatically stops when not needed. This initial contact almost invariably produces a slight crack in the slate into which the chisel blade advances owing to the pressure in the cylinder. If the resistance is slight the blade goes forward and there is no vibration. If the resistance is greater, the rotating hammer will produce vibration as soon as the chisel comes forward. Frequently the split runs ahead of the advance of the chisel sufficiently so that there is no hammer action for quite a distance. Thus as the split starts with the blade coming in contact with the block, a maximum number of blows will be obtained, and the number of blows decreases as the chisel advances.

Also associated with the slider 41 are the tappets 123, 124, hereinafter described. These are so located as to trip the lifter valve 61 when the chisel has advanced far enough into the slate block so that it will stand of itself. The effect of this is to relieve any pressure by the lifter on the block at the same time that the pusher plates withdraw from the slate, thus permitting the lifter to freely lift the split-off block and deliver it to the ejector. Otherwise there is danger that the slate will be broken or the chisel bent or broken.

This lifter valve 61 is a four-way valve and is hydraulically connected to a lifter cylinder 59. The plunger 60 in this cylinder activates gears 58 to turn the lifter 57 upwardly about its hinge. When in its up or vertical position this lifter serves to determine the position of the squared block for splitting, and after the split it drops the multiple thickness block down to the right to be ejected from the blocker. The lifter is an L-shaped piece viewed from the side of the machine. It is hinged near the junction of the two legs. The short leg is the one adapted to underlie the front edge of the slate block when the lifter is in its up position. This lower or short leg slopes down slightly in the direction from which the squared blocks approach. This permits a little tipping motion of the lifter before it actually lifts a split-off multiple thickness block. The movements of the parts are so adjusted that about the time a multiple thickness block is completely separated from the rest of the squared block, pressure will be brought to bear on the bottom of the multiple thickness block by the lifter, lifting it and causing it to fall over against the still nearly vertical long leg of the lifter.

The gears 58 of the lifter not only turn the lifter and control the pusher valve 70 associated with the pusher as above described, but a projection on the hinge shaft of the lifter also controls a four-way ejector valve 64. This last valve controls a cylinder 63 which operates the ejector 62 working in conjunction with the lifter 57. The ejector valve 64 is also connected directly to the hydraulic pressure line 13. The cooperation of the lifter and ejector is such that as the lifter lowers a newly split-off multiple thickness block to horizontal, the ejector, whose lower end is pivoted on the frame of the machine, projects up in back of the block and, swinging to the right as viewed in Fig. 9, pushes the block off into the next conveyor. As the ejector pushes the block onto the conveyor, the lifter returns to its vertical position.

It is necessary to provide correct positioning of the squared block 35 in two dimensions with relation to the chisel. As far as concerns the thickness of the multiple thickness block 38 to be split off, the lifter 57 in its upright position acts as a stop (see Fig. 9). The slate coming to the blocker will be of various lengths, ranging from 12 to 24 inches. These lengths lie crossways of the machine in the direction of the chisel, and it is therefore necessary that each block be pushed up against the chisel. It is also necessary to back up the block to provide resistance against the blows of the chisel. To perform these functions I provide an abutment cylinder 115 (see Fig. 10). This is located on the opposite side of the machine and opposite to the chisel. The piston 116 of the abutment cylinder is connected to a plate 117 guided by top and bottom slides 118, the plate 117 acting directly against the block. The cylinder is controlled by a hydraulic circuit so arranged and timed that as the pusher levers 55 and plates 52 are pushing the block in its final position as far as concerns the thickness of the block to be split off, the abutment cylinder 115 is pushing the block the proper distance toward the chisel. The chisel 39, when in retracted or "overtravel" position, is in back of a slot or opening in its housing plates 66, which are determinative of the position to which the block must be brought. It is desirable to have the block brought to within ¼" of the housing plates and stop in that position, and that it be held there by the piston 116 of the abutment cylinder 115. To stop the block in this position I provide an abutment stop 65 controlling the abutment stop valve 67 in the hydraulic circuit operating the abutment cylinder. The stop 65 is a bell crank lever pivoted just in back of an opening in the housing plate 66. One leg of this lever projects through the opening a half inch. Whenever the abutment cylinder piston 116 has pushed a slate block against the bell crank lever until it is ¼" from the housing plate, the other end of the bell crank lever will operate the valve 67 and cut off the supply of fluid for the hydraulic cylinder. This stops the block ¼" from the housing plate and in proper position to begin the splitting operation. The valve is a two-way valve.

In order to insure that the chisel stops operating when a split is completed and does not begin again until the new portion of the block or a new block is in position, I provide what I call a block pilot valve 47 near the housing plate (Figs. 11 and 12). This is controlled by a pilot bell crank lever 120 which is adapted to project through the housing. This lever 120 can be in a somewhat elevated position above the level of the bottom of the slate block, and I prefer to locate it ahead of the chisel 39. Its pivot is horizontal and its leg extends to the right from the pivot point. Thus the leg projecting through an opening 119 in the housing plate (see Fig. 11) will be depressed only when there is slate to the left of the chisel, as viewed in Fig. 9. When there is no block at the chisel this bell crank will be released and the pilot valve operated. The pilot valve 47 is in the hydraulic circuit leading to the three-way valve 46. By reversing the flow of current in the three-way valve the operation of the hammer can be controlled.

The circuit containing the abutment cylinder and abutment stop valve 67 also contains a four-way abutment valve 68 hereinafter described.

Referring more particularly to Fig. 11 and associated parts, if there is no block of slate in the blocker position to be split, the bell crank lever 120 of the block pilot valve 47 projects outwardly through the opening 119 in the abutment housing plate 66. This permits the fluid pressure from the line 13 to flow through the valve 47 to the left end of the valve 46. This in turn has the effect of preventing the flow of liquid to the four-way chisel valve 43 and therefore the hammer and chisel reciprocation stops.

When the bell crank lever 120 is in this released position, the three-way valve 46 sends pressure to the hand control valve 51. The handle of this valve 51 when vertical is in its stopped or neutral position. Moving the handle to the right starts the upend mechanism, while moving the handle in the other direction reverses the direction of movement of the upender. This reversing movement can be availed of to stop the machine if an emergency occurs at the time of starting.

It will be noted in Fig. 17 that the lever 120 is only a short distance prior to, i. e., at the left of, the chisel. When a block of slate is in position to be split by the chisel 39 of the blocker, the bell crank lever 120 therefore is acted on by the block of slate to depress the plunger of the block pilot valve 47. With this setting of the valve 47, fluid flows from the pressure line 13 through the valve 47 to the right-hand end of the three-way valve 46. This pressure opens the larger passage shown on top of the valve on the left, and pressure is transmitted to the flow control valve 45. From here the pressure is transmitted to the valve 43. Reciprocation of the slider 41 by the cylinder 42 is caused by the arrival of this pressure at the valve 43. The reciprocation of the slider and hammer is under the control of the valve rod 44.

Referring now to Figs. 12 and 17 of the drawings, when the slate block to be split in position in the blocker has been so reduced in thickness that it does not extend more than a quarter of an inch to the left of the chisel blade as viewed in Fig. 17—or there is no block there at all—the reciprocation of the chisel is automatically stopped. The opening in the face plate 66 in this figure denotes the location of the chisel blade. As can be seen from Fig. 17, when the block positioned for cutting does not extend back past the center line of the chisel to lever 120, the end of the lever, impelled by its compression spring shown in Fig. 11, will push outwardly and allow the plunger of the pilot valve 47 to come out. This causes an interchange of the fluid circuits, such that the valve 46 shuts off the flow of liquid to the cylinder 42. The movements of the chisel and hammer thereupon stop. It will be seen that this valve 47 therefore performs the additional function that the hammer cannot operate unless slate is in the position to be split. Stopping the movement of the chisel and hammer also stops the operations of lifter valve 61 and four-way abutment valve 68.

The principal function of the two-way abutment valve 67 is to stop the flow of pressure to the abutment cylinder 115 when a slate block has been pushed up to the abutment plate 66. Locating a block in this position depresses the abutment stop 65 operating the abutment valve 67 to shut off the flow of liquid to the abutment cylinder 115. This occurs when the block is still one-quarter of an inch from the surface of the abutment plate 66.

I will now describe the manner in which the lifter valve 61 and four-way abutment valve 68 and associated parts are constructed and operated. Referring to Figs. 11 and 16, it will be noted that there are two arms 69 secured to the slider 41 extending downwardly to positions approximately opposite the valve 61, 68. These arms are rigid with relation to the slider and are spaced on opposite sides of the valves, as shown in Fig. 11. Extending between and carried by the arms 69 are wires 122. One wire is directly above the valve 61 and the other directly above the valve 68. The relation of each wire 122 to each valve can be seen in Fig. 16. On each of these wires 122 are a pair of tappets 123, 124, which are offset laterally with relation to each other on the rod. The tappet 123 on each rod is normally to the left of the valve, as seen in Fig. 11, i. e., longitudinally of the wire, and the other tappet 124 is to the right, as seen in this same dimension. As shown in Fig. 16, which views the set-up in cross-section of the wire 122, there are lugs 125 and 126 carried by the valves 61 and 68, lug 125 being in line with tappet 123 and lug 126 being in line with tappet 124. It will be seen that when the slide moves out of the cylinder it carries the tappet 123 into contact with its lug 125, changing the direction of flow in valves 61 and 68. When the slide 41 returns in the cylinder 42, the tappet 124 contacts the lug 126 of each valve and returns the valve to its original setting. These movements occur only when the slide, hammer and chisel move far enough to bring one of the tappets into contact with its lug. The slide 41 also has rigidly fastened to it a finger 56 which encircles the rod 44 and slides thereon. Upon extremes of movement of the hammer, this finger 56 will engage one of the stops 56a on the rod 44 and move the rod a short distance. This movement of the rod from one longitudinal position to the other is sufficient to reverse the valve connections in the valve 43. It will be seen, therefore, that through the finger 56 the length of stroke of the hammer can be controlled.

The function of the lifter valve 61 is to operate the lifter cylinder to take multiple thickness blocks away from the chisel as soon as the blocks are split off. This valve causes these operations at the proper time through tappets 123, 124, as above described. To understand this it should first be noted that the hammer is mounted on the slide 41 and the forepart of the hammer casing carries the chisel 39. Thus the position of the slide 41 is determined by the position of the chisel with relation to the slate block. The position of the tappets being determined by the arms 69 and the slide, it will be seen that the tappets can be adjusted to act on the lifter valve at the desired stages in the splitting operation. I have found that the splitting of the slate occurs about the time the chisel has penetrated one-half to two-thirds of the length of the block or sooner. The tappet 123 is therefore set to move the lug 125 and change the direction of flow of the liquid in the valve 61 just at this stage of the splitting. This operates the lifter to lower the split-off block. When the slide 41 has moved back toward the cylinder 42, the tappet 124 hits the lug 126 and reverses the flow through valve 61 once more, returning the lifter to its up position.

The function of the abutment valve 68 is to operate the abutment cylinder and to operate the pusher plates and their levers until all slate has been ejected from the blocking machine. These functions all occur during the "overtravel." During the time the slate is being split, valve 70, under the control of the lifter, causes the pusher plates to recede. The rise of the lifter resets valve 70. In the meantime valve 68 has changed so that abutment cylinder 115 reverses. This will also hold the pusher plates back until the tappet has turned valve 68 to position to move the pusher plates and the abutment plate inward again. This sets the parts for a new split.

When the entire block has been split off and ejected, a four-way valve 70 operated by the lifter 57 is connected in circuit through the upender valve 53 to a by-pass valve 71 for the pusher cylinder 54. This circuit permits the pusher levers 52 to swing freely as the carrier 33 is lowered to and raised from the loading position. This occurs when valve 47 changes the circuit in valve 46 to shut fluid off from valve 43. With this setting, fluid under pressure is sent through the manual valve 51. This operates the upender cylinder 36 to lower the carrier to the loading position, thus closing valve 53. This isolates pusher cylinder 54 from pressure. However, the pusher cylinder is left connected to the return line through the abutment cylinder circuit and valve 68. In the meantime the downward movement of the slide carrying the pusher levers has caused valve 71 to connect the two ends of cylinder 54 together. This permits the fluid to flow from one side of the cylinder to the other. This is necessary in order to supply extra liquid to permit the oscillation of the piston in pusher cylinder 54 caused by the lever 55 as the carrier is rotated downward.

*Roller conveyors and final splitting machines*

The multiple thickness blocks 38 coming from the blocking machine may be of various lengths and widths. I prefer to locate a sorter where the blocks come out of this machine. If but one size of block is coming through, his duty is confined to an examination of the blocks to sort out any that are not suitable. If, however, the mill is manufacturing two or more sizes of shingles, it is preferable to have a separate machine for splitting each length of shingle. This avoids the necessity of adjusting a machine when the block length changes. Each splitting machine or splitter 72 can take all of the widths commercially used in the length to which it is adjusted. With a multiplicity of lengths coming through, I therefore provide a multiplicity of sorting roller conveyors 73, 74, 75, 76. In Figs. 2 and 14 they are shown arranged one above the other. The sorter then has the duty of separating the different lengths onto the different conveyors so that only one length goes to any one machine.

It has been found from experience that while the sculping machine and the blocking machine can keep approximate pace with each other, the number of splitting operations performed on the multiple thickness blocks by the final splitting machine is so great that it takes more than one such final splitter to split all the product of one blocking machine. I find that it takes about eight splitters to one sculper and one blocker, if the blocker is making "eighters." In Fig. 2 I have therefore shown eight of the third type machines 72 divided into four groups of two each. Each group takes the slate of one length coming to it on one of the four conveyors 73, 74, 75, 76 shown in Fig. 14. Three of these conveyors can be portable and subject to rearrangement according to the work being done.

The splitting machines to which the multiple thickness blocks come are similar to the blocking machine in that each has only one chisel 77, but they differ in that the blades are broader and that the machines contain equipment for splitting the blocks in half of their thickness as received from the blocker (see Fig. 13). This kind of split is obtained by centering equipment 78 of the same general type as shown in the Vincent F. Lake British Patent No. 220,158. The centering operation is performed during the end of the "overtravel" and the release of the centering devices occurs just after the chisel enters the slate. The construction of the center line splitter is claimed in my copending application Ser. No. 202,480, filed December 23, 1950, now Patent No. 2,626,597, dated January 27, 1953.

The operator at each splitter picks up a multiple thickness block with his left hand and swings it into the machine, approximately to the center. The machine then centers it and splits it into equal parts. The operator lays the left-hand part down and the machine centers and splits the one on the right. If these are now the final thickness, they are laid on a gravity conveyor 79 at the right and slide down to the middle of the battery of machines opposite the trimming machines 121. If the thickness is not the one desired, the procedure is repeated until it is the one desired, and the last pair is laid in the conveyor. Then the operator goes back to the left-hand pile, picks up the piece on the top of the pile, splits it and lays the result on the conveyor, then picks up another on that pile and repeats.

*Shingle gravity conveyors*

As shown, there are four shingle gravity conveyors 79 to assemble the final shingles 40 at two points 80 midway on the battery of splitters. One pair of gravity conveyors is on the outside of the four machines located on one side of the block conveyors from the sculping machine, and the other pair is on the outside of the remaining four machines located on the other side of the block conveyors. Each pair of shingle conveyors carries the shingles to a midpoint opposite a trimming or dressing machine 121.

It is desired to call attention to one important effect of the particular arrangement of splitters and conveyors described above. It provides a simple sorting of the shingles as to both widths and lengths without delaying the operations in any way. Thus the operator between the splitter and the sorting conveyors 73—76 separates the blocks to go to the four groups of splitters according to length. The block gravity conveyors 73—76 make it possible for each splitting machine operator to put shingles of his special length on the shingle gravity conveyor 79 in piles according to width. As a result, the dresser receives the shingles in piles sorted as to both length and width. If desired, each group of two splitters can be located with one machine on each side of the sorting conveyors. In this case one of the machines in the group can take only blocks of certain widths and the other machine will take the other widths. In this way the variety of widths of shingles reaching one dressing machine can be minimized at the expense of an increase in the number of lengths of shingles reaching that dressing machine.

Each trimmer can be a duplex one, i. e., it can trim a shingle first on two sides and then on the other two, all on one pass through the machine. If desired, the slate also can be punched or given scalloped edges instead of straight edges in these trimming machines. Each trimmer is set for a definite length and width of shingle. If other sizes come through they can be set aside and allowed to accumulate until it becomes worth while to change the setting of the trimmer.

The layout just described, using about twenty men, can produce about two hundred squares per day of medium-size shingles. It can produce shingles in four different sizes at the same time. It has the full range of sizes required for the slate shingle roofing market.

If it were required to produce some slate veneers, two of the splitters might be designated for that work. The first machine would take one inch or two inch blocks and reduce them to quarter inch blocks. The second machine equipped with a sensitive fingered blade would be used to reduce the quarter inch blocks to blocks one-sixteenth of an inch.

It is also possible to use the sculper for making sheets thirty-two by sixteen inches, which is the size contemplated for stucco and slate support.

It is believed that the above plan and process provide for making all the sizes of split slate shingles for which at present there is any contemplated use, except for the very small sizes for tile work.

It will be seen that it is essential in my process to have more than one type of operation performed on the slate by my various chisel splitting machines, and that the advance determination and sawing of one of the dimensions of the finished product, in combination with use of mechanical splitting machines for both the other dimensions, are required to give my increased efficiency. I have also found that speed of production makes it extremely important to convey the material from one machine to another, as with my machines the splitting consumes only a minor part of the time. This makes it possible to speed up the production many times beyond that in the hand process which history shows has been practised for centuries.

As far as concerns reduction of waste of raw material, in addition to the reduction due to the use of machine splitting by means of chisels, I find that the following features of my process and mechanism have a definite effect in reducing the waste. The advance determination of one of the final dimensions by means of sawing in a plane that is perpendicular to both the primary and secondary planes of cleavage saves all unnecessary loss in that dimension. This also makes it possible in the sculping machine to deal with a smaller block in splitting in the direction of the grain. This, in turn, taken in connection with the use of operating chisels on both the sawn edges of the strip, makes it possible to minimize loss from faults due to the grain. The turning up of the block from the sculping machine so that the planes of cleavage are vertical, minimizes breakage at the blocking machine.

It should be pointed out that there is considerable saving in my process, not only in that it is adapted to be carried out on blocks that have been stored an indefinite length of time, but also in that the required manhandling of the raw material is kept to a minimum because the mechanism is adapted to deal simultaneously with the making of slate of a number of different sizes, as will inevitably occur in dealing with the natural raw product.

I claim:

1. In a process for producing slate shingles or the like from quarried slabs, the steps of sawing the quarried slab crossways of the grain at intervals approximating one dimension of the shingle other than the thickness, then sculping the sawn strip simultaneously from both sides at points opposite each other in the direction of the grain at intervals approximating the second dimension other than the thickness by means of power-driven chisels, and thereafter splitting the resulting squared block to shingle thickness.

2. In a process for producing slate shingles or the like from quarried slabs, the steps of sawing the quarried slab crossways of the grain at intervals approximating one dimension of the shingle other than the thickness, sculping the sawn strip from both sides simultaneously at points opposite each other in the direction of the grain at intervals approximating the second dimension of the desired shingle other than its thickness, splitting the resulting squared block to an even factor multiple of the desired shingle thickness and then splitting such multiple thickness block to the final thickness by repeatedly splitting it in half.

3. The process of producing slate shingles or the like from a quarried slab comprising the steps of determining the most profitable dimensions of final products to be obtained from a particular quarried slab in the light of any imperfections in it, sawing the block at right angles to the grain in accordance with that determination, cutting the sawn strip for the second dimension by a sculping machine containing power-driven chisels operating against both sawn edges simultaneously at points opposite each other, standing such block on edge with its primary cleavage plane substantially parallel to gravity and splitting the block into even factor multiples of the desired shingle thickness, and finally splitting such multiple thickness blocks to the final thickness by repeatedly splitting the blocks in half.

4. In a process for producing slate shingles or the like from quarried slabs, the steps of first sawing strips from a slab in a direction substantially perpendicular to the primary planes of cleavage and the grain, then producing squared blocks by splitting a strip in the direction of the grain by power-driven chisels operating from both sides of the sawn strip at points opposite each other, and thereafter turning the squared blocks with their primary planes of cleavage vertical and splitting on those primary planes of cleavage from one edge only.

5. In a machine process for producing slate shingles or the like from a quarried slab having primary planes of cleavage and a grain substantially at right angles to those primary planes, the steps of forming the slab into strips by repeated or simultaneous sawing of two cuts running across the grain and planes of cleavage, spaced apart a distance equal to the desired shingle length, and thereafter reducing the sawn strips to shingles by a plurality of power-driven chisel operations as follows: reducing the sawn strips to squared blocks by the use of chisels operating from opposite points on the sawn edges located so as to produce a dimension substantially equal to the shingle width, thereafter reducing the squared block to one or more blocks equal in thickness to an even factor multiple of the desired shingle thickness by chisel means operating from one side in the primary planes of cleavage, and then reducing the multiple thickness block to pieces of shingle thickness by splitting the slate repeatedly from the center in the primary planes of cleavage.

6. In a machine process for producing slate shingles or the like from quarried slabs, the steps of sawing the slabs crossways of the grain at distances approximating the shingle length, sculping the sawn strips in a splitting machine by simultaneous power-driven chisels hammering from both sawn edges at points opposite each other in the direction of the grain at distances approximating the shingle width, splitting the resulting squared blocks to an even factor multiple of the shingle thickness in a second splitting machine and splitting the multiple blocks to shingle thickness on a plurality of other splitting machines.

7. In a machine process for producing slate shingles or the like from a quarried slab, the steps of determining the most economical lengths of shingle which can be produced from the slab with the lengths running with the grain, sawing the slab crossways of the grain into strips whose widths approximate the various lengths thus determined, sculping such sawn strips in a machine having power-driven chisels operating simultaneously from both sawn edges at points opposite each other to produce squared blocks whose dimension across the grain approximates the width of the shingles, splitting these squared blocks on a blocking machine on the primary planes of cleavage to reduce them to blocks whose thickness is an even factor multiple of the desired shingle thickness, distributing these multiple thickness blocks among a plurality of other splitting machines according to the shingle lengths of the blocks and then reducing the blocks to shingle thickness by splitting them repeatedly from the center in the primary planes of cleavage.

8. In a machine process for producing slate shingles or the like from quarried slabs, the steps of sawing the slabs crossways of the grain to give the length of the shingles, using a mechanical conveyor to carry the resulting strips into a sculping machine, sculping the strips by power-driven chisels in the machine operating on both sides of the strips at points opposite each other to give them the width of the shingles, transporting the resulting squared blocks to a blocking machine by means of a mechanical conveyor, splitting the squared block in the blocking machine by power-driven chisel means operating on one face of the block to produce a block whose thickness is an even factor multiple of the shingle thickness, and then using mechanical conveyor means to carry the multiple thickness blocks to one or more third type mechanical splitting machines, and reducing the blocks to shingle thickness on those machines by repeatedly splitting the material in the center.

9. In a machine process for producing slate shingles or the like from quarried slabs according to claim 8, having the material lying on a primary cleavage face in the sculping machine but standing on a primary cleavage edge in the blocking and final splitting machines.

10. Apparatus for producing slate shingles or the like from quarried slabs, comprising saw means adapted to cut across the grain of quarry slabs, producing sawn strips, a mechanical splitting machine adapted to sculp the sawn strips in the direction of the grain, producing squared blocks, and a second mechanical splitting machine adapted to split the squared block on the primary planes of cleavage into a block whose thickness is an even factor multiple of the desired final thickness, in combination with a third mechanical splitting machine adapted to split the multiple block to the thickness of the final product desired.

11. Apparatus for producing slate shingles or the like from quarried slate according to claim 10 in which there are power-driven conveyor means between the sculping and blocking machines and the blocking machine contains a chisel whose blade lies in a vertical plane, in combination with means located between the sculping machine and the chisel of the blocking machine adapted to up-end the squared block with its primary cleavage planes parallel to the chisel of the blocking machine.

12. Apparatus for producing slate shingles or the like from quarried slabs according to claim 11 in which the blocking machine also contains pushing means to move the squared blocks from the up-ender into splitting position, and a multiple thickness stop cooperating with the pushing means to position the squared block, in combination with ejector means to push the multiple thickness blocks out of the blocking machine.

13. Apparatus for producing slate shingles or the like from quarried slabs according to claim 10 in which there is power-driven conveyor means to feed sawn strips to the sculping machine, said conveyor having a plurality of parallel conveyors and controls adapted to permit the operator to vary the relative speeds of the conveyors, whereby the angle of presentation of the sawn strips to the sculping machine can be adjusted.

14. Apparatus for producing slate shingles or the like from quarried slabs according to claim 10 in which there is a conveyor between the sculping and blocking splitting machines, in combination with a battery of third type splitting machines to split the multiple blocks, and a plurality of gravity conveyors between the blocking machine and the third type machines to distribute the multiple blocks among the third type machines.

15. Apparatus for producing slate shingles or the like from quarried slabs according to claim 14 in which there also are a plurality of gravity conveyors beside the third type of splitting machines to collect the shingles at one point intermediate the ends of the battery of those machines.

16. Apparatus for producing slate shingles or the like from quarried slabs according to claim 15 in which the third type splitting machines are arranged in two rows on opposite sides of the gravity conveyors from the blocking machine, and there are gravity conveyors on the outer sides of the rows of machines to collect the shingles, whereby shingles of different sizes can be assembled at different points.

17. Apparatus for producing slate shingles or the like from quarried slabs according to claim 16 in which there is a trimming machine adjacent the collection point for the outside gravity conveyor, whereby a single trimmer can be availed of to trim various sizes of shingles.

18. Apparatus for operating on quarry slabs of slate or the like comprising saw means adapted to cut across the grain of quarry slabs producing sawn strips, and a mechanical splitting machine adapted to sculp the sawn strips in the direction of the grain simultaneously from both sides of the strip at opposite points, producing squared blocks, in combination with power-driven conveyor means between the saw means and the sculping machine adapted to feed the sawn strips to the sculping machine.

19. Apparatus for operating on quarry slabs of slate or the like according to claim 18 in which the conveyor means comprises one conveyor extending part way from the saw means to the sculping means, and control means for that conveyor located near the saw means, in combination with a second conveyor connecting the sculping machine to the first conveyor, and control means adjacent the sculping means adapted to control the two conveyors independently of each other.

20. Apparatus for operating on quarry slabs of slate or the like according to claim 19 in which the second conveyor has two parallel power-driven rows of rollers and the control means adjacent the sculping means is adapted to permit the operator to vary the relative speeds of the two parallel rows, whereby the angle of presentation of the sawn strips to the sculping machine can be adjusted.

21. Apparatus for operating on quarry slabs of slate or the like according to claim 20 in which there is a free roller at the end of the first conveyor, and the beginning of the second conveyor is slightly lower than the free roller, whereby a sawn strip on the end of the first conveyor will not proceed onto the second conveyor until the second conveyor is started.

22. Mechanism for operating on quarry slabs of slate or the like comprising saw means adapted to cut across the grain of such slabs, producing sawn strips, a sculping machine adapted to split the sawn strips along the grain into squared blocks, and conveyor means adapted to carry the strips to the sculping machine, in combination with a second splitting machine adapted to split the blocks in their primary planes of cleavage, a second conveyor adapted to bring the squared blocks to the second machine, and a dumper associated with the second conveyor to remove ragged ends of slate from the second conveyor.

23. Mechanism according to claim 22 in which the second conveyor has a chain geared to move with the conveyor belt and removable indicators in that chain, the dumper having a valve tripped by each indicator and adapted to operate the dumper, and control means at the sculping machine for the dumper, whereby the operator at the sculping machine can remove ragged ends of slate from the second conveyor without leaving his position.

EUGENE T. LAKE.

References Cited in the file of this patent

UNITED STATES PATENTS

| Number | Name | Date |
| --- | --- | --- |
| 1,217,152 | Chauvin | Feb. 27, 1917 |
| 1,590,385 | Lake | June 29, 1926 |
| 1,654,770 | Williams | Jan. 3, 1928 |
| 1,841,018 | Eickhoff | Jan. 12, 1932 |
| 1,909,001 | Nelson | May 16, 1933 |
| 2,467,728 | Burt | Apr. 19, 1949 |